Nov. 4, 1969  A. A. PEDU  3,477,056
HIGH PRECISION POTENTIOMETER AND METHOD MAKING THE SAME
Filed Dec. 28, 1967  2 Sheets-Sheet 1
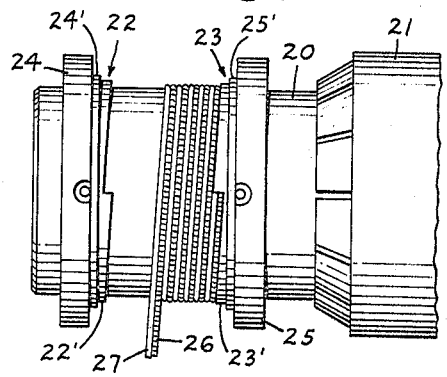
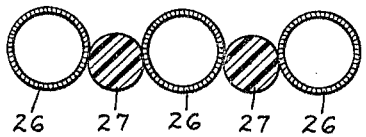
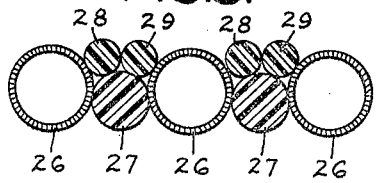
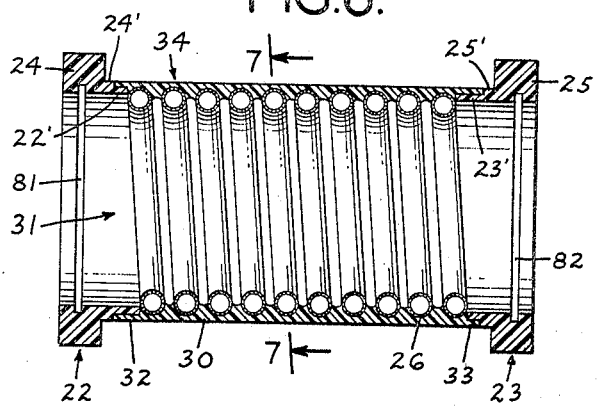
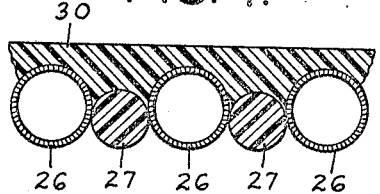
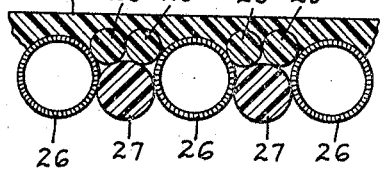
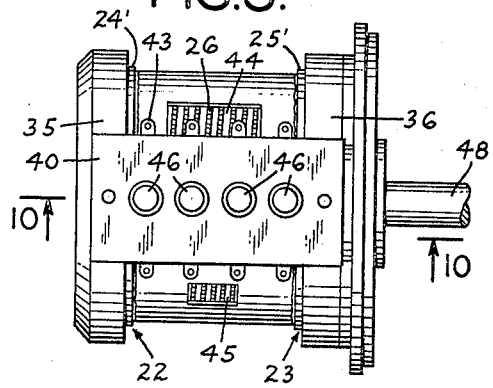
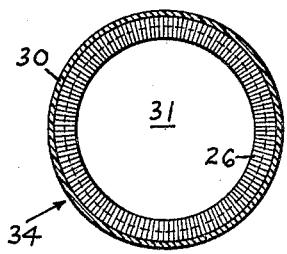

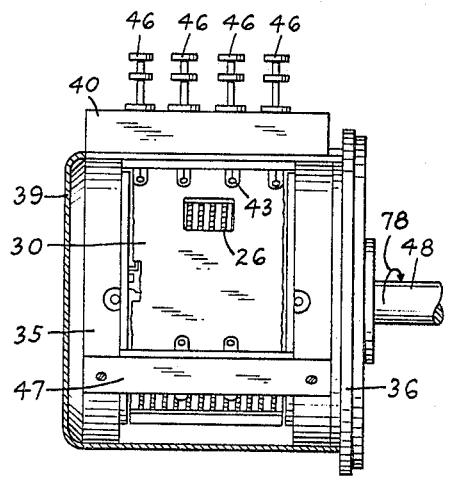

United States Patent Office 3,477,056
Patented Nov. 4, 1969

3,477,056
HIGH PRECISION POTENTIOMETER AND METHOD MAKING THE SAME
Alexander A. Pedu, 1 Treeview Drive, Melville, N.Y. 11746
Filed Dec. 28, 1967, Ser. No. 694,218
Int. Cl. H01c 5/00, 1/12
U.S. Cl. 338—135                                    8 Claims

ABSTRACT OF THE DISCLOSURE

A high precision potentiometer without a core and having the winding turns embedded in plastic. The potentiometer is provided with adjustable phasing rings to permit accurate adjustment of the slider and stops and with a wiper assembly including a guide block and follower constructed so as to avoid lost motion when the direction of rotation of the potentiometer assembly is changed. In making the winding, the wire is wound on a mandrel with the turns separated by a Teflon wire or wires. An epoxy cement is spread on the winding and is cured and hardened. The mandrel is then removed and the Teflon wire or wires are then pulled out into the hollow central space.

BACKGROUND OF THE INVENTION

The present invention relates to high precision potentiometers of the type widely used in aircraft electronic equipment and other electronic apparatus. In such potentiometers it is important that the turns of the winding be very accurately located and that they be held rigidly in position.

In the past these requirements have been met through expensive and relatively difficult manufacturing operations. An important object of the invention has been to provide a potentiometer of this type in which the winding can be made economically.

Another object of the invention has been to provide a novel, improved and inexpensive method of making such windings.

Still another object of the invention has been to provide such a potentiometer in which the slider mechanism will not have lost motion when the direction of rotation of the potentiometer is reversed.

A further object of the invention has been to provide an end stop construction which permits accurate adjustment of the end stopping positions of the slider.

Another object of the invention has been the provision of a potentiometer whose winding is readily accessible for effecting connection of taps and which can readily be provided with a bridge or bridges for facilitating making connections.

Other and further objects, features and advantages of the invention will appear more fully from the appended drawings and the following description.

SUMMARY

In accordance with the method of the invention, a potentiometer winding is formed by winding a resistance wire in closely spaced, tight turns on an insulating wire mandrel to form a potentiometer wire, positioning a pair of end rings at axially spaced locations on an elongated mandrel and affixing the end rings at these locations; simultaneously winding the potentiometer wire and a plastic wire on the elongated mandrel with the plastic wire lying between and in intimate contact with the turns of the potentiometer wire; applying a coating of an electrically insulating, hardenable resin which becomes rigid when hardened to the exterior of the turns of potentiometer wire and plastic wire and to the adjacent portions of the end rings, the resin being of a type which will not bond to the plastic wire but which will bond to the potentiometer wire and to the portions of the end rings; hardening the coating of resin; then withdrawing the elongated mandrel from the end rings and the turns of potentiometer wire and plastic wire; and then pulling the plastic wire into the space left by withdrawal of the elongated mandrel without disturbing the turns of the potentiometer wire and removing the plastic wire from the space.

In accordance with the invention, the potentiometer is constructed with a pair of axially spaced end rings; a winding formed from potentiometer wire disposed in an open helix having a plurality of spaced turns spanning the space between the end rings; a hardened resin coating on the outer surfaces of the winding and the adjacent portions of the end rings and bonding the same into a unitary assembly; a pair of end cap members each disposed axially outwardly of a respective one of the end rings; a rotatable shaft; bearing means for supporting the shaft at the axial center line of the helix; a guide block mounted on and rotatable with the shaft within the helix, the guide block having a pair of radially extending walls forming an axially extending slot in the radially outer surface of the block, the outer upper edge of at least one of the walls being rounded to provide an arcuate surface; a generally T-shaped follower having a central leg located in the slot and being axially slidable therein and having arms overlying the walls of the slot; one of the arms having a depending extension contacting the arcuate surface of the adjacent wall of the slot; the follower having a pair of parallel, spaced, arcuate flanges on the radially outer surface thereof arranged to encompass therebetween a turn of the winding; the leg being narrower than the slot; wiper means mounted on the follower and arranged to contact the winding turn encompassed between the flanges, contact between the wiper means and the winding turn urging the leg of the follower into the slot and causing contact between the depending extension and the outside surface of the adjacent wall of the slot and between the leg and the inside surface of the adjacent wall of the slot, thereby preventing lost motion of the leg in the slot and of the wiper on the winding when the direction of rotation of the shaft is changed.

Also in accordance with the invention, the end rings each have a radially and circumferentially extending groove on the inner annular surface thereof; a pair of arcuate phasing members, each slidably mounted in one of the grooves; releasable means, e.g., screws, for attaching the end cap members to respective ones of the phasing rings thereby to clamp the corresponding end rings, phasing rings and end caps together to prevent relative rotation of the corresponding end rings and end cap members; and a pair of stop members each mounted on and projecting from a respective one of the end caps in the path of the follower to provide positive end travel stops for the follower, the circumferential location of the stop members being individually adjustable by releasing the corresponding releasable means and rotating the corresponding phasing ring and end cap to a different circumferential position.

DESCRIPTION OF THE DRAWINGS

FIG. 1 is a plan view of a mandrel showing the winding of the turns of the potentiometer in accordance with the invention;

FIG. 2 is a fragmentary sectional view illustrating the winding as placed on the mandrel of FIG. 1 with separating means between the winding turns;

FIG. 3 is a fragmentary view similar to FIG. 2 but illustrating a modification of the method of the invention;

FIG. 4 is a fragmentary sectional view similar to FIG. 2 but showing a later stage in the method of the invention;

FIG. 5 is a fragmentary sectional view of the same stage as shown in FIG. 4 but applied to the modification shown in FIG. 3;

FIG. 6 is a longitudinal sectional view of a winding embodying the invention with the mandrel removed and with the separating means removed;

FIG. 7 is a sectional view taken on the line 7—7 of FIG. 6;

FIG. 8 is a plan view of a potentiometer embodying the invention with the outer cover removed;

FIG. 9 is a side view, partly in cross section, of the potentiometer of FIG. 8;

FIG. 10 is a cross sectional view taken along the line 10—10 of FIG. 8.

FIG. 11 is a cross-sectional view taken along the line 11—11 of FIG. 10;

FIG. 11A is a fragmentary enlarged sectional view showing in greater detail portions of FIG. 11; and FIG. 12 is an isometric view of the slider of the potentiometer of FIGS. 8–11.

DESCRIPTION OF THE PREFERRED METHOD OF THE INVENTION

In preparing the potentiometer winding the resistance wire is first wound in closely spaced, tight turns on an insulating wire mandrel, as is customary in making potentiometer windings. For example, the insulating wire mandrel may be held tightly between two chucks and the chucks and wire mandrel may be rotated to cause the resistance wire to be wrapped in a tight helix around the insulating wire mandrel.

Next a potentiometer mandrel, e.g., the metal cylinder 20 of FIG. 1, is mounted in a rotatable chuck 21 and is fitted with two spaced cylindrical end rings 22 and 23. The mandrel 20 is not to be included in the final potentiometer and hence is reusable an unlimited number of times. The mandrel 20 may be made as accurately as desired because the cost of precision production will be amortized over a large number of individual potentiometers. The end rings 22 and 23, which are preferably made of plastic, e.g., a varnished phenolic resin, are held in position on the mandrel 20 by set screws, pins or other suitable means. The end rings 22 and 23 have cylindrical main body portions 24 and 25, respectively, reduced diametric annular ring portions 24' and 25', respectively, and projecting annular flange portions 22' and 23', respectively.

The insulating wire mandrel, designated 26 in FIG. 1, with its closely spaced, tight turns of resistance wire is then wound on the mandrel 20 by rotating chuck 21. A plastic wire 27 is simultaneously wound on the mandrel 20 so that the wire 27 lies between adjacent turns of the wire 26. The wires 26 and 27 should be in close contact and the diameter of the wire 27 should be selected to afford a desired spacing or pitch between adjacent turns of the wire 26. The wire 27 is preferably a polymerized tetrafluoroethylene, e.g., Teflon or a similar plastic such as a polymerized trifluorochloroethylene, e.g., Kel-F.

The wires 26 and 27 are shown in the fragmentary sectional view of FIG. 2. If desired, additional plastic wires may be wound outside the wire 27, for example as shown by the wires 28 and 29 in FIG. 3. The wires 28 and 29, which also are preferably made of Teflon, may be wound simultaneously with the wires 26 and 27 or may be wound in a separate winding operation. The wires 28 and 29 are of smaller diameter than the wire 27 and together span the space between adjacent turns of the wire 26 when contacting the wire 27, as shown in FIG. 3. The wires 28 and 29 will normally be used when spacing or pitch between adjacent turns of wire 26 is small.

When the wires 26 and 27 or 26, 27, 28 and 29, as the case may be, are completely wound on mandrel 20 between end rings 22 and 23, an epoxy resin or other electrically insulating resin which is rigid when hardened is spread as a relatively thick coating on the outer surface of the wires and the adjacent outer surfaces of the annular flange portions 22' and 23' of end rings 22 and 23. The resin is then cured or allowed to harden. The wires with the resin coating are shown in FIGS. 4 and 5 which correspond, respectively, to FIGS. 2 and 3. The resin is designated 30.

As shown in FIG. 4, the resin 30 does not extend inwardly past the points of contact between the wires 26 and 27. In FIG. 5 the resin does not extend inwardly past the points of contact between the wires 26–28, 26–29 and 28–29. The reason for using the wires 28 and 29 when a small pitch (and hence a small diameter wire 27) is used is to avoid the resin extending inwardly beyond the midpoint of the turns of wire 26.

After the resin has hardened the end rings 22 and 23 are freed from the mandrel 20 and the mandrel 20 is removed from the assembly of wires and end rings which are held together as a hollow cylinder by the hardened resin. Since the wires 26 will be tightly wrapped around the mandrel 20, the mandrel 20 should not be slid out until the resin is hardened. In order to minimize disturbance of the resistance wire, it is desirable that the mandrel be pulled out in a direction corresponding to the direction of wrapping of the resistance wire on the insulating wire mandrel.

The plastic wires 27 are then removed by pulling them into the hollow central space 31 shown in FIGS. 6 and 7. With the arrangement of FIGS. 3 and 5, the plastic wires 28 and 29 may be removed easily by pulling into the space 31 after the wire 27 has been removed. The wires 27, 28 and 29 are preferably made of Teflon (or a plastic of similar characteristics) because this material will not bond or adhere to the usual potting resins which may be used for the coating 30. Plastic wires other than Teflon can, of course, be used if they are not easily deformable and will not bond or adhere to the resin.

The diameter of the wire 27 should not be greater than that of the wire 26. If it were, the wire 27 could not be removed without displacing the turns of the wire 26. Similarly, the diameter of the individual wires 28 and 29 should be less than that of the wire 27 so that the wires 28 and 29 can be pulled into the space 31 through the opening left by removal of the wire 27.

The unitary assembly of end rings 22 and 23, wire 26 and resin 30 is shown in FIGS. 6 and 7. As is shown in FIG. 6, the plastic coating 30 extends in the form of annular flanges 32 and 33 over the adjacent ends of the end ring flanges 22' and 23', respectively. It is desirable that the end rings 22 and 23 bond to the plastic 30. The respective ends of the wire 26 may be anchored to the end rings as is customary in potentiometer design. The axially inner ends of the end rings may be shaped to accommodate the ends of the helix, as shown in FIG. 6.

Description of the potentiometer construction of the invention

The potentiometer winding of FIGS. 6 and 7 is designated 34 and comprises simply the helically wound insulating wire mandrel 26 (with its wrapping of resistance wire), end rings 22 and 23 and hardened plastic coating 30.

As shown in FIG. 10, the winding 34 is mounted on end caps 35 and 36. The end cap 35 has an annular shoulder 37 which accommodates cylindrical body 24 of winding end ring 22.

Similarly end cap 36 has an annular shoulder 38 which accommodates cylindrical body 25 of winding end ring 23.

The end cap 36 forms the front wall of the potentiometer assembly and hence should be a complete disk, as indicated in FIG. 11. However, the rear end cap 35 is enclosed by a removable cylindrical metal cover 39 closed at the rear and open at the front. The cover 39 fits snugly over end ring bodies 24 and 25 and the open end abuts against the inner face of end cap 36. Cover 39 is preferably held in place by screws (not shown) acting in threaded holes in body 25. In view of the cover end wall forming a rear closure for the potentiometer, rear end cap 35 need not be a solid disk but may, if desired, be made as a spider.

Cover 39 is provided with an axial slot extending inwardly from the cover open end. The slot accommodates a bridge 40 which extends axially between end rings 22 and 23 and is affixed to the latter by screws 41. Bridge 40 is provided with a hollow central space 42 in which are provided a number of contact elements 43 which may be connected by wires (not shown) to various points on the winding 26 or to various fixed resistors or other circuit elements carried on the outer surface of the plastic 30 or elsewhere on the potentiometer assembly.

Where it is desired to make (or be able to make) connections to the winding 26, windows are left in the plastic 30, for example as shown at 44 and 45. Such windows may be cut in the plastic but it is much more desirable to apply a Teflon tape or like coating to the window area to prevent a resin covering being formed on the window area.

External connections are conveniently effected by means of contact studs 46 each affixed at one end to a respective contact element 43. The other ends of the studs 46 project outwardly for external connections.

It will be understood that as many circuit element mounting bridges as may be desired can span the distance between end rings 22 and 23, e.g., the bridge 47 shown in FIG. 9. By providing a number of such bridges, windows in the resin coating 30 and accessible connections to the winding 26, great flexibility in use of the potentiometer is afforded.

As is customary, the potentiometer is provided with a rotatable operating shaft. The shaft, which is designated 48, is journaled for rotation in bearing elements 49 and 50 provided in rear end cap 35 and front end cap 36, respectively. The bearings 49 and 50 may be simple bearing surfaces or bushings or may be ball bearings or other low friction bearing elements.

The bearing element 49 is shown simply as an annular shoulder of end cap 35 which bearing element 50 is shown as a separate bushing carried in an annular opening in front end cap 36. Axial motion of shaft 48 is restrained by split retaining rings 51 and 52 mounted in slots in the shaft and arranged to bear against vertical surfaces of bearing elements 49 and 50, respectively.

Shaft 48 has mounted thereon a guide block 53 which is best shown in FIG. 12. The guide block 53 has a cylindrical passageway 54 which accommodates shaft 48. It is desirable that there be a tight fit (preferably a press fit) between shaft 48 and passageway 54 or that other means, e.g., set screws, be provided to cause guide block 53 to rotate with, but not on, shaft 48.

A bushing 55 is carried on shaft 48 and is affixed thereto or press fit thereon to rotate with the shaft. Bushing 55 contacts a rear vertical face of bearing element 50 and a front vertical face of block 53 to prevent axial motion of block 53 or shaft 48 toward the front end cap 36. Another bushing 56 which is preferably made of plastic, is likewise mounted on, or affixed to, shaft 48 and contacts a front vertical face of the bearing portion 49 of rear end cap 35 and a rear vertical face 57 of block 53 to prevent axial motion of block 53 or shaft 48 toward rear end cap 37. An annular ring 58 of the bushing 56 contacts and preferably is adhesively affixed to arcuate overhanging surfaces 59 and 60 provided at the rear end of block 53 and formed by a recess 61 in the rear end wall of block 53.

A conductive metal slip ring 56' is cemented to bushing 56. A conductive metal whisker or brush 56a is arranged to contact slip ring 56'. The whisker 56a projects from end ring 22 and leads to an external contact terminal (not shown).

The upper surface of block 53 is provided with an axially extending rectangular slot 62 having vertical side walls 63 and 64 and a bottom wall 65. The term vertical, as used in this context, has reference to the surface dispositions as shown in the drawings. Each end of each of the side walls 63 and 64 is provided with a notch to define projecting noses 65, 66, 67 and 68. The notches, which are designated 65', 66', 67' and 68', permit the guide block 53 to be rotated past stop pins as will be described below.

The bottom surface of block 53 is provided with a like configuration in case it is desired to provide an additional follower so as to have a double wiper potentiometer.

A follower 69 is slidably mounted in slot 62. Follower 69 is generally T-shaped in cross section with a central leg 70 fitting into slot 62 and arms 71 and 72 overlying side walls 64 and 63, respectively. The upper surface of follower 69 is arcuate and is provided with a pair of spaced, parallel upstanding arcuate guide flanges 73 and 74 which are intended to accommodate therebetween a turn of the winding 26, as is best shown in FIG. 10.

An arcuate metal contact support element 75 is carried in the slot 76 formed between flanges 73 and 74 and projects beyond the slot 76 on both sides thereof. The central portion 77 of element 75 is located within the slot 76.

The projecting portions of element 75 are formed with enlarged heads having sharp points. The points 77a and 77b shown in FIG. 12 enter an axial slot 69a provided in the vertical side wall of arm 71 of follower 69. The corresponding sharp points at the other end of element 75 enter a similar slot 69b provided in the vertical side wall of arm 70 of follower 69. The arrangement is such that engagement of the points of element 75 in the slots 69a and 69b causes the element 75 to be retained in position with central portion 77 in slot 76 and in contact with the upper surfaces of follower 69.

A wiper 75a, which is preferably formed of precious metal, is affixed to element 75 adjacent one end thereof. The other end of wiper 75a overlies the central portion 77 in slot 76, as shown in FIG. 12. Wiper 75a acts as a spring which because of contact between wiper 75a and the bottom of the turn of winding 26 centered in slot 76 urges follower 69 downwardly into slot 62 of guide block 53. Wiper 75a serves as the electrical contact to the winding turns. The electrical circuit is completed through element 75 and a wire (not shown) connected to holes provided in one end of element 75, and which electrically connects element 75 to slip ring 56'.

As is best shown in FIGS. 11 and 11A, the top of wall 64 is spaced from the overlying under surface of arm 71. However, the top of wall 63 contacts the overlying under surface of arm 72 to provide support for the latter.

In operation, as the shaft 48 is rotated, guide block 53 rotates therewith. Contact between the winding turn 26 and the walls of slot 76 forces follower 69 to slide axially in slot 62, the direction of sliding being dependent on the direction of rotation of shaft 48. For example, rotation of shaft 48 in the direction of arrow 78 (FIG. 10) will force follower 69 to slide to the left (FIG. 10) in slot 62 toward end cap 35. Reverse rotation of shaft 48 will force follower 69 to slide in the opposite direction.

The width of slot 62 should be slightly greater than the width of the central leg 70 of follower 69 so that the follower will slide very easily in slot 62. Typically this clearance might be of the order of .002 inch. The presence of this clearance aids in easy potentiometer operation but tends to result in lost motion when a change occurs in the direction of rotation of shaft 48.

Such lost motion of the follower 69 and hence also of the wiper 75a is undesirable in that it permits error in the potentiometer setting.

To avoid the lost motion, the right hand edge of central leg 70 (FIG. 11) is held in contact with the adjacent vertical surface of wall 64 and an inclined shoulder 79 of arm 71 is held in contact with outer inclined surface 80 of wall 64. The two contacts referred to occur from the wedging action which results from downward springing of wiper 75a occurring because of contact between the wiper 75a and the winding turn. Since both sides of the wall 64 are at all times in contact with corresponding surfaces of leg 70 and arm 71, lost motion is avoided when the linear direction of travel of follower 69 is changed. Since leg 70 is in contact with the adjacent surface of wall 64, the clearance between leg 70 and the walls of slot 62 all appears between leg 70 and the adjacent vertical surface of wall 63.

The opposite arm 72 of follower 69 is spaced away from the vertical surface of wall 63 to avoid binding of the follower 69 in slot 62, as is clearly shown in FIG. 11. However, the under surface of arm 72 is supported on the top surface of wall 63.

It is desirable that the angle of inclination of wall 79 of follower 69 be different than the angle of inclination of outer wall 80 of block 53 so that contact between these surfaces will occur essentially along a line rather than an area. Typically wall 79 might be disposed at an angle of 30° to the vertical, while wall 80 might be disposed at an angle of 15° to the vertical. The upper edge of surface 80 of wall 64 is rounded, as shown at 80', so that contact between surface 79 of follower arm 71 and wall 64 occurs along a line of an arcuate surface. The wedging action is best illustrated in the enlarged fragmentary view of FIG. 11A.

It is desirable that the rotation of shaft 48, and hence change of position of follower 69 and wiper 75a, be halted at fixed points at opposite ends of the potentiometer adjustment. It is also desirable that the locations of those fixed points be adjustable. For this purpose, end rings 22 and 23 are provided with annular internal slots or grooves 81 and 82, respectively, as is best shown in FIG. 6.

Slots 81 and 82 accommodate phasing rings 83 and 84, respectively, as is best shown in FIG. 10. The phasing rings are flat metal plates which are arcuate in shape, as shown in FIG. 11. The rings 83 and 84 are provided with threaded holes which accommodate screws 85 which act in holes provided in end caps 35 and 36, respectively. It has been found preferable to provide three equally spaced screws 85 for each end cap.

The screws 85, acting in the holes in the respective end caps and in the threaded holes in the respective phasing rings, serve to hold the end caps 35 and 36 tightly in contact with the end rings 22 and 23, respectively, as shown in FIG. 10.

Stops 86 and 87, which may be pins or studs, project inwardly from end caps 35 arnd 36, respectively, at a radial location corresponding to the notches 65'–68' defined by noses 65–68. As shown, the stop 86 may extend into the notches 67' and 68' and the stop 87 may extend into notches 65' and 66'. Stop 86 is positioned so that when follower 69 approaches end cap 35, the central leg 70 of follower 69 will contact stop 86 and prevent further axial motion of follower 69 toward end cap 35 and hence also further corresponding rotational motion of block 53 and shaft 48. Similarly, stop 87 is positioned so that when follower 69 approaches end cap 36, the central leg 70 of follower 69 will contact stop 87 and prevent further axial motion of follower 69 toward end cap 36 and further corresponding rotational motion of block 53 and shaft 48.

It will be evident that the circumferential positions of stops 86 and 87 will determine the precise axial positions at which linear travel of follower 69 will be arrested. The circumferential positions of the stops 86 and 87, or either of them, can readily be changed by loosening the screws 85 so that the end caps will not be held tightly against the end rings. The end caps can then be rotated, causing the corresponding phasing rings to progress through a corresponding arcuate path in their slots. When a stop is in the desired circumferential position, the screws 85 of the corresponding end cap are tightened to press the end cap against the corresponding end ring to hold the end cap rigidly in position.

While the invention has been described in connection with a specific embodiment thereof and in a specific use, various modifications thereof will occur to those skilled in the art without departing from the spirit and scope of the invention as set forth in the appended claims.

What is claimed is:

1. A potentiometer, comprising:
   (a) a pair of axially spaced end rings, each having a radially and circumferentially extending groove on the inner annular surface thereof;
   (b) a winding formed from potentiometer wire disposed in an open helix having a plurality of spaced turns spanning the space between said end rings;
   (c) a hardened resin coating the outer surfaces of said winding and the adjacent portions of said end rings and bonding the same into a unitary assembly;
   (d) a pair of end members each disposed axially outwardly of a respective one of said end rings;
   (e) a rotatable shaft;
   (f) bearing means for supporting said shaft along the axial center line of said helix;
   (g) a guide block mounted on and rotatable with said shaft within said helix, said guide block having a pair of radially extending walls forming an axially extending slot in the radially outer surface of said block, at least one of said walls having an arcuate surface at the upper-outer edge thereof;
   (h) a generally T-shaped follower having a central leg located in said slot and being axially slidable therein and having arms overlying the walls of said slot, the one of said arms overlying said one wall having a depending extension contacting said arcuate surface of said one wall of said slot, said follower having a pair of parallel, spaced, arcuate flanges on the radially outer surface thereof arranged to encompass therebetween a turn of said winding, said leg being narrower than said slot;
   (i) wiper means mounted on said follower and arranged to contact the winding turn encompassed between said flanges, contact between said wiper means and said winding turn urging said leg of said follower into said slot and causing contact between said depending extension and said arcuate surface and between said leg and the inside surface of said one wall of said slot, thereby preventing lost motion of said leg in said slot and of said wiper on said winding when the direction of rotation of said shaft is changed;
   (j) a pair of arcuate phasing members, each slidably mounted in one of said grooves;
   (k) releasable means for attaching said end members to respective ones of said phasing rings thereby to clamp the corresponding end rings, phasing rings and end members together to prevent relative rotation of said corresponding end rings and end members; and
   (l) a pair of stop members each mounted on and projecting from a respective one of said end members in the path of said follower to provide positive end travel stops for said follower, the circumferential location of said stop members being individually adjustable by releasing the corresponding releasable means and rotating the corresponding phasing ring and end cap to a different circumferential position.

2. A potentiometer as set forth in claim 1 in which said one of said arms is spaced from the radially outer surface of said one wall and in which the other of said arms is in slidable contact with the radially outer surface of the other of said walls.

3. A potentiometer, comprising:
   (a) a pair of axially spaced end rings;
   (b) a winding formed from potentiometer wire disposed in an open helix having a plurality of spaced turns spanning the space between said end rings;
   (c) a hardened resin coating the outer surfaces of said winding and the adjacent portions of said end rings and bonding the same into a unitary assembly;
   (d) a pair of end cap members each disposed axially outwardly of a respective one of said end rings;
   (e) a rotatable shaft;
   (f) bearing means for supporting said shaft along the axial center line of said helix;
   (g) a guide block mounted on and rotatable with said shaft within said helix, said guide block having a pair of radially extending walls forming an axially extending slot in the radially outer surface of said block, at least one of said walls having an arcuate surface at the upper-outer edge thereof;
   (h) a generally T-shaped follower having a central leg located in said slot and being axially slidable therein and having arms overlying the walls of said slot, the one of said arms overlying said one wall having a depending extension contacting said arcuate surface, said follower having a pair of parallel, spaced, arcuate flanges on the radially outer surface thereof arranged to encompass therebetween a turn of said winding, said leg being narrower than said slot; and
   (i) wiper means mounted on said follower and having a spring arm arranged to contact the winding turn encompassed between said flanges, contact between said wiper means and said winding turn urging said leg of said follower into said slot and causing contact between a surface of said depending extension and said arcuate surface and between said leg and the inside surface of said one wall of said slot, thereby preventing lost motion of said leg in said slot and said wiper on said winding when the direction of rotation of said shaft is changed.

4. A potentiometer as set forth in claim 3 in which said one of said arms is spaced from the radially outer surface of said one wall and in which the other of said arms is in slidable contact with the radially outer surface of the other of said walls.

5. A potentiometer as set forth in claim 4 in which the outer surface of said one wall of said slot is inclined with respect to the radial axis of said slot at a first angle, said surface of said depending extension being inclined with respect to the radial axis of said slot at a second angle greater than said first angle.

6. A potentiometer, comprising:
   (a) a pair of axially spaced end rings, each having a radially and circumferentially extending groove on the inner annular surface thereof;
   (b) a winding formed from potentiometer wire disposed in an open helix having a plurality of spaced turns spanning the space between said end rings;
   (c) a hardened resin coating the outer surfaces of said winding and the adjacent portions of said end rings and bonding the same into a unitary assembly;
   (d) a pair of end members each disposed axially outwardly of a respective one of said end rings;
   (e) a rotatable shaft;
   (f) bearing means for supporting said shaft at the axial center line of said helix;
   (g) a guide block mounted on and rotatable with said shaft within said helix, said guide block having a pair of radially extending walls forming an axially extending slot in the radially outer surface of said block;
   (h) a follower having a leg located in said slot and being axially slidable therein, said follower having a pair of parallel, spaced, arcuate flanges on the radially outer surface thereof arranged to encompass therebetween a turn of said winding;
   (i) wiper means mounted on said follower and arranged to contact the winding turn encompassed between said flanges;
   (j) a pair of arcuate phasing members, each slidably mounted in one of said grooves;
   (k) releasable means for attaching said end members to respective ones of said phasing rings thereby to clamp the corresponding end rings, phasing rings and end members together to prevent relative rotation of said corresponding end rings and end members; and
   (l) a pair of stop members each mounted on and projecting from a respective one of said end members in the path of said follower to provide positive end travel stops for said follower, the circumferential location of said stop means being individually adjustable by releasing the corresponding releasable means and rotating the corresponding phasing ring and end member to a different circumferential position.

7. A potentiometer as set forth in claim 6 in which said phasing members are each provided with a plurality of spaced threaded holes, said end members are each provided with a like plurality of correspondingly spaced holes, and said releasable means are a like plurality of screws acting in respective ones of said holes in said end members and corresponding holes in said phasing members.

8. A potentiometer as set forth in claim 6 in which said guide block has notches at each end thereof aligned with said slot and positioned to permit said guide block to be rotated past said stop member until said follower contacts one of said stop members.

References Cited

UNITED STATES PATENTS

| 3,314,036 | 4/1967 | Kruse | 338—143 |
| 2,729,720 | 1/1956 | Knoll | 338—143 |
| 3,156,888 | 11/1964 | Blanco | 338—202 X |
| 3,139,601 | 6/1964 | Kruse et al. | 338—143 |
| 2,961,626 | 11/1960 | Moore et al. | 338—143 |
| 2,978,662 | 4/1961 | Bell | 338—143 |
| 3,058,808 | 10/1962 | Laubenfels | 338—143 |

LEWIS H. MYERS, Primary Examiner

A. T. GRIMLEY, Assistant Examiner

U.S. Cl. X.R.

338—124, 143, 202